March 25, 1941.　　　F. R. ZABEL　　　2,236,391
LOCKING DEVICE
Filed April 3, 1940　　　2 Sheets-Sheet 1

INVENTOR.
Frederick R. Zabel
BY Robert Irving Williams
ATTORNEY.

March 25, 1941.  F. R. ZABEL  2,236,391
LOCKING DEVICE
Filed April 3, 1940  2 Sheets-Sheet 2

INVENTOR.
Frederick R. Zabel
BY Robert Irving Williams
ATTORNEY.

Patented Mar. 25, 1941

2,236,391

UNITED STATES PATENT OFFICE 2,236,391

LOCKING DEVICE

Frederick R. Zabel, New York, N. Y.

Application April 3, 1940, Serial No. 327,544

9 Claims. (Cl. 292—173)

This invention relates to locking devices, and more particularly to locking devices of the character utilized on the sliding doors of washing machines.

An object of the invention is to provide a locking device which is simple and practical and which will have a long life.

Another object is to provide a locking device of such character that the bolt thereof is positively held against accidental opening.

Another object is to provide a locking device wherein the parts may be adjusted with a special ease and efficacy.

Another object is to provide a locking device wherein tendencies toward breakage and wear on the parts are minimized.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

The locking devices used for the doors of rotatable drums of washing machines are subject to very severe conditions of use, and there are tendencies for various of the parts to break or wear even under ordinary use. Furthermore, while the handles of such devices are desirable raised beyond the periphery of the drum to open the lock, it is highly desirable that such handles should be contained substantially within the periphery of the drum during rotation thereof.

The present invention accordingly contemplates the provision of a locking device wherein the foregoing and other difficulties are overcome and the various needs satisfied in a practical and effective manner.

For a fuller understanding of the nature and objects of the invention reference should be had to the following detailed description taken in connection with the accompanying drawings in which.

Figure 1:
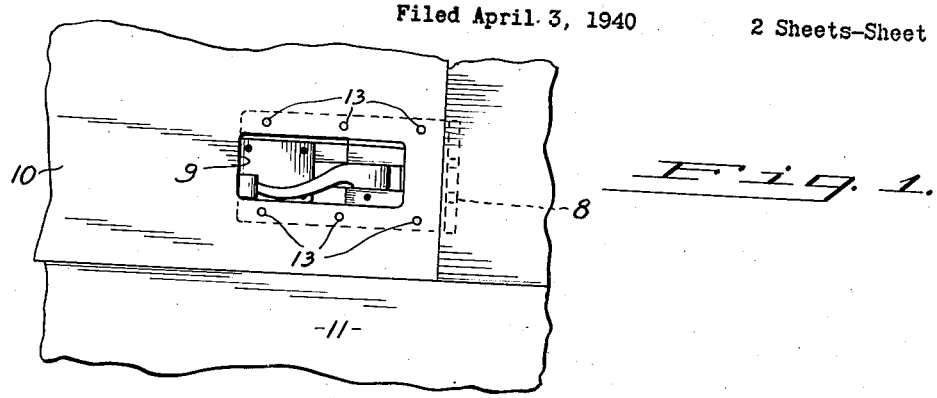
Figure 1 is a front view of a portion of a washing machine door having a locking device embodying the invention incorporated therein.

The locking device, as exemplified, includes bolt-member 5 having in its forward end a bolt or bolt-head 6 adapted to project out of the end of casing 7 for reception by a keeper 8. The casing 7 is adapted to be set within an opening 9 in the door 10 of the drum 11 of a washing machine, and is provided with flanges 12 which are secured to the door 10 by means of rivets 13. On either side of the bolt-member 5 there are provided, within the casing, guide members 14 and 15 which serve to provide a guideway for a bolt-member therebetween. The forward half of each of these members occupies the full depth of the casing, whereas the rear half is of reduced extent.

The bolt-member terminates short of the rear of the casing, and behind the same there is provided a stiff coil spring 16, which lies between the rear ends of the guide members and tends to press the bolt-member outwardly. The forward end of the spring fits over a projection 17 on the bolt member 5 and the rear end bears against the rear of the casing. In order to hold the spring securely in place, a removable plate 18 is secured by screws 19 upon the rear ends of the guide members, the rear end of the bolt-member being of sufficiently reduced height to slide under this plate. The bolt-member increases in height to the full depth of the casing toward its forward end, and, in accordance with certain of the specific aspects of the invention, the bolt 6 is also of the full depth of the casing to provide greater strength and wearing service.

Figure 2:
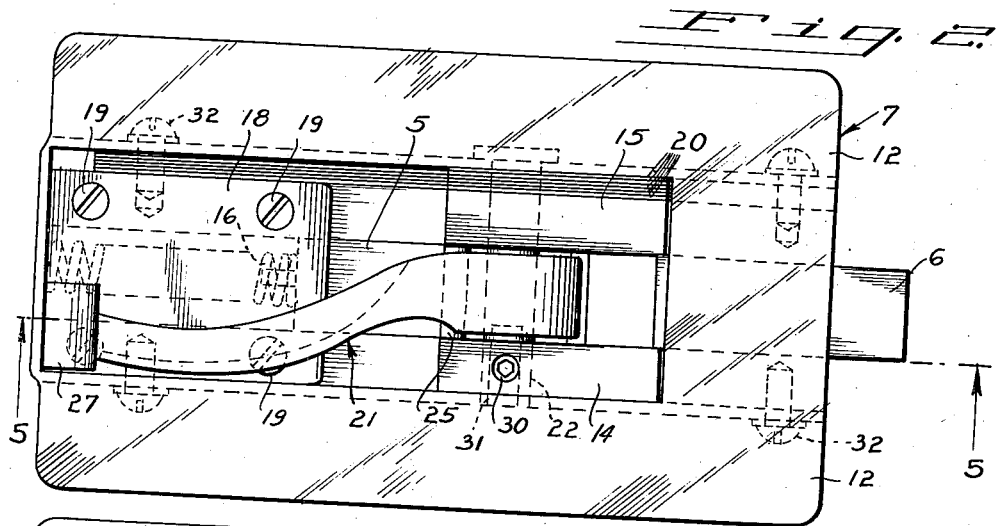
Fig. 2 is an enlarged front view of the form of locking device shown in Fig. 1.
Figure 3:
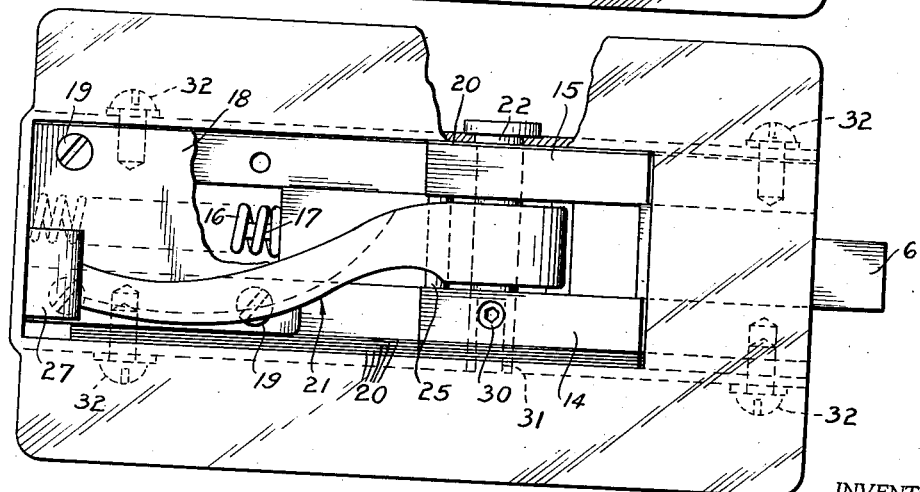
Fig. 3 is a similar view showing the device after adjustments have been made to compensate the wear on the bolt, certain of the parts being cut away to indicate the parts below the same.
Figure 4:
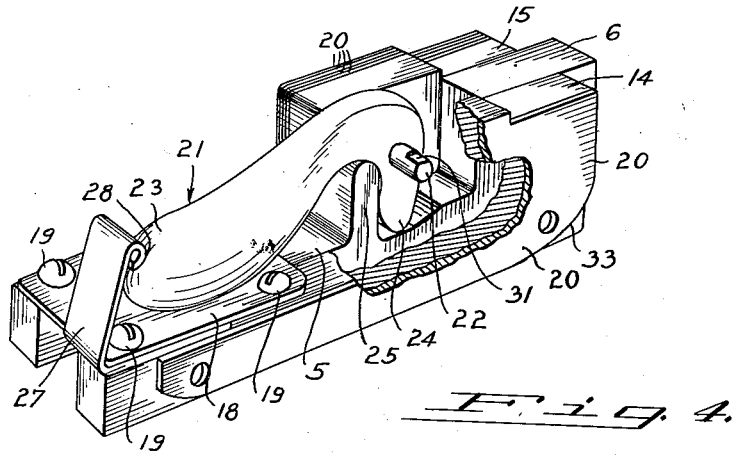
Fig. 4 is a perspective view of the elements of the device with casing removed, certain of the parts being cut away.

In use in a washing machine, the upper surface of the bolt tends to wear, due to tendencies of the washing machine door on which the bolt is mounted to open, whereas the lower surface has a relatively slight tendency to wear since the door tends to rest on its sill when in closed position. Accordingly, as the machine is used the bolt-head tends to wear down on its upper surface so that instead of having its full thickness as in Fig. 2, it has a reduced thickness, such, for example, as shown in Fig. 3, it being noted that the wear occurs on the upper surface rather than the lower surface of the bolt. In order to permit this wear to be taken up in as simple and effective manner as possible there are provided between the upper guide member 15 and adjacent wall of the casing a plurality of shims 20 each of which is adapted to be individually moved from the position shown in Fig. 2 to a position between the lower guide member 14 and the wall of the casing adjacent to it, upon the removal of retaining means as more fully described hereinafter. Whenever the upper surface of the bolt has worn away an extent corresponding to the width of one shim, a shim may be transferred from an upper position to a lower position so as to bring the upper surface of the bolt into the same position relative to the casing, and accordingly to the door, as it was before the wear occurred.

Figure 5:
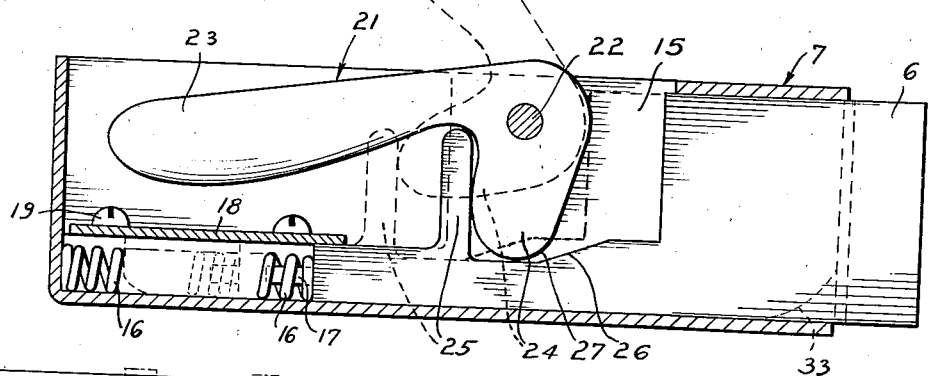
Fig. 5 is a sectional view along the lines 5—5 of Fig. 2.
Figure 6:
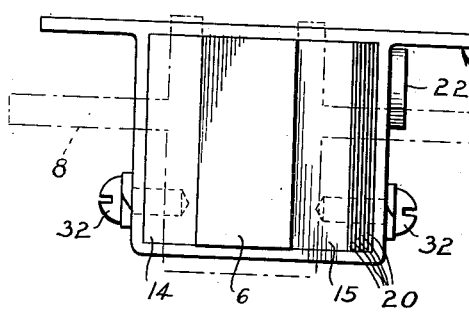
Fig. 6 is an end view of the forward end of the device.

In order to withdraw the bolt there is provided an operating member 21 pivoted on a transverse pin 22, and comprising a handle portion 23 at the rear of the pivot and adapted to be moved between a depressed position shown in full lines in Fig. 5 and an elevated position shown in dotted lines in Fig. 5. The operating member also carries a depending cam-lug 24 adapted to be pressed against an upwardly extending portion 25 of the bolt-member at the rear of the pivot point to withdraw the bolt as the handle portion 23 is moved to its lifted position. The portion 25 extends upwardly a sufficient distance in the present instance to limit the downward movement of the handle portion so that the latter will be prevented from contacting the plate 18 when it drops to its depressed position under the influence of the spring 16. By this means tendencies toward breakage of the plate, the spring, and the handle are minimized.

In spite of the various precautions taken against the breaking of the spring 16, the conditions of use of a machine such as exemplified are sufficiently harsh so that breakage of such a spring will sometimes occur. It might then be possible for the bolt to open. In order to guard against such a result, there is provided, in accordance with the invention, positive means to prevent the withdrawal of the bolt as long as the operating member is in the position shown in full lines in Fig. 5; the exemplified means comprising cooperating means on the bolt-member and the operation member. In the present instance, there is provided a downwardly and rearwardly inclined shoulder 26 on the bolt-member adapted to contact a rearwardly receding portion 27 on the bottom of the lug 24. The rearward movement of the bolt-member will accordingly cause a wedging action at the bottom of the lug which will tend to press the lug upwardly rather than rearwardly, and will accordingly act as a positive stop for a sufficient rearward movement of the bolt-member to withdraw it from its keeper.

There is also provided a spring catch 27 consisting of a strip of stainless spring steel one end-portion of which is secured under the plate 18 by one of the screws 19, and the other end-portion of which extends upwardly and has an inturned edge at its upper end 28. When the handle portion 23 drops to depressed position, it presses the upper end 28 of the spring strip 27 rearwardly and seats under this end. This tends to hold the handle portion downwardly, and to assure that, in order to lift the handle at all, sufficient pressure will be applied to the handle to lift it to elevated position.

In order to permit the ready disassembly of the locking device for the movement of the shims or replacement or adjustment of other parts, and at the same time to hold the elements securely together, the pin 22 extends thru the casing, the guide members, and the shims; but is removably mounted, being removable upon the unscrewing of a screw-bolt 30 which extends thru the guide member 14 and screws against a recessed portion 31 of the pin 22. In the present instance supplemental retaining means, in addition to the pin 22 and the screw-bolt 30, and consisting of screws 32 extending thru the side walls of the casing, and thru any shims that may be adjacent thereto, into threaded bores in the adjacent guide members 14 and 15, respectively, are provided.

The pin 22 and the screws 32 may be readily removed from the inside of the drum 11 when the door 10 is open, the casing 7 being left in place. Upon the removal of the pin 22, the operating member 21 may be readily removed. If it is desired to replace the bolt-member 5, the plate 18 should also be removed. Upon the removal of the pin 22 and the screws 32 one or more shims may be removed from one side of the casing and inserted at the other side of the casing before the removal of the plate 18. To facilitate their removal, the shims are formed with rearwardly receding surfaces 33 on their forward lower edges to provide a portion on which they can be rocked when the rear end thereof is lifted; it being noted that the rear end of each shim terminates short of the rear end of the casing.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. A locking device comprising a slidable bolt-member having a bolt at its forward end, a spring tending to press said bolt-member forwardly, a pivoted operating member having a handle portion, and being adapted to withdraw said bolt when said handle portion is moved to operate said operating member, and cooperating wedging means on said bolt-member and on said operating member and operative on a partial rearward movement of said bolt-member, at all times except when said handle has been moved to operate said operating member for the withdrawal of said bolt, to thrust said operating member toward its pivot point to prevent swinging movement of said operating member and further rearward movement of said bolt member.

2. A locking device comprising a slidable bolt-member having a bolt at its forward end, a spring tending to press said bolt-member forwardly, a pivoted operating member having a handle portion on the rear side of its pivot and adapted to be moved between depressed and elevated positions, said operating member having a depending lug beneath said pivot, said lug being adapted when the handle is lifted to bear rearwardly against a portion of said bolt-member to withdraw said bolt, said lug having a receding surface at its forward side, and said bolt-member having a portion adapted to contact said receding surface if said bolt should be moved rearwardly when said handle is in depressed position to positively prevent the withdrawal of said bolt except when said handle is lifted.

3. A locking device comprising a slidable bolt-member having a bolt at its forward end, a spring tending to press said bolt-member forwardly, a pivoted operating member having a handle portion and adapted to be moved between depressed and elevated positions, said operating member having a depending lug beneath said pivot, said lug being adapted when the handle is lifted to bear rearwardly against a portion of said bolt-member to withdraw said bolt, and cooperating means on said lug and said bolt member adapted to exert an upward wedging action of said lug against said pivot upon rearward movement of said bolt-member when said handle is in depressed position.

4. A locking device comprising a casing, a bolt-member slidable in said casing and having a bolt-head at its forward end, elements on either side of said bolt-member and providing a guideway therefor, a swingable operating member having a portion disposed in said guideway, said bolt-member and said guideway-providing elements being shiftable laterally in said casing, and removable spacer elements disposed between at least one of said guideway-providing elements and said casing and being adapted to be transferred from one side of said casing to the other side thereof to compensate for wear on one side of said bolt-head.

5. A locking device comprising a casing, a bolt-member slidable in said casing and having a bolt-head at its forward end, elements on either side of said bolt-member and providing a guideway therefor, a swingable operating member having a portion disposed in said guideway, said bolt-member and said guideway-providing elements being shiftable laterally in said casing, removable spacer elements disposed between at least one of said guideway-providing elements and said casing and being adapted to be transferred from one side of said casing to the other side thereof to compensate for wear on one side of said bolt-head, and retaining means comprising a removable pin extending thru said guideway-providing elements and said spacer elements and said operating member and providing a pivot for the latter, said spacer elements being adapted to be moved from one side of said casing to the other side of said casing on the removal of said retaining means to permit the shifting of the position of said guideway and said bolt-member.

6. A locking device comprising a casing, a bolt-member slidable in said casing and having a bolt-head at its forward end, elements on either side of said bolt-member and providing a guideway therefor, a swingable operating member having a portion disposed in said guideway, said bolt-member and said guideway-providing elements being shiftable laterally in said casing, removable spacer elements disposed between at least one of said guideway-providing elements and said casing and being adapted to be transferred from one side of said casing to the other side thereof to compensate for wear on one side of said bolt-head, and retaining means comprising a removable pin extending thru said guideway-providing elements and said spacer elements and said operating member and providing a pivot for the latter, said spacer elements having receding forward lower edges to provide pivot points on which they may be rocked to facilitate the removal and reinsertion thereof upon the removal of said retaining means.

7. A locking device comprising a slidable bolt-member having a bolt on its forward end, a spring tending to press said bolt-member forwardly, a pivoted operating member having a handle portion at the rear side of its pivot and adapted to be moved between depressed and elevated positions, said operating member having a depending lug disposed forwardly of said handle portion, said bolt member being formed with an upward projection adapted to be pressed against the rear of said lug by the action of said spring, said lug being adapted when the handle is lifted to bear rearwardly against said projection to withdraw said bolt, and means on said projection to limit the downward movement of said handle.

8. A locking device comprising a slidable bolt-member having a bolt on its forward end, a spring tending to press said bolt member forwardly, a pivoted operating member having a handle portion at the rear side of its pivot and adapted to be moved between depressed and elevated positions, said operating member having a depending lug at its forward end, said lug being adapted when the handle is lifted to bear rearwardly against a portion of said bolt-member to withdraw said bolt, and means on said portion of said bolt-member and providing a stop portion in the path of downward movement of said handle portion to limit the movement of said operating member when said handle reaches a depressed position.

9. A locking device comprising a casing, a bolt-member slidably mounted in said casing and having a bolt at its forward end, guide members on either side of bolt-member, a spring bearing against a rearward portion of said bolt-member and tending to press said bolt forwardly, a pivoted operating member having a handle portion adapted to be moved between depressed and lifted positions, said operating member having a portion adapted to bear against a portion of the bolt-member to withdraw said bolt when said handle portion is lifted, spacer elements disposed between at least one of said guide members and said casing, and a removable pin providing a pivot for said operating member and extending through said operating member and said guide members and said spacer elements and a portion of said casing to retain said members and said elements within said casing.

FREDERICK R. ZABEL.